United States Patent [19]
Johnson

[11] Patent Number: 5,870,573
[45] Date of Patent: Feb. 9, 1999

[54] TRANSISTOR SWITCH USED TO ISOLATE BUS DEVICES AND/OR TRANSLATE BUS VOLTAGE LEVELS

[75] Inventor: Leith L. Johnson, Fort Collins, Colo.

[73] Assignee: Hewlett-Packard Company, Palo Alto, Calif.

[21] Appl. No.: 733,483

[22] Filed: Oct. 18, 1996

[51] Int. Cl.$^6$ .................................................. G06F 13/00
[52] U.S. Cl. ........................ 395/311; 395/309; 395/287; 395/474; 395/494; 395/444
[58] Field of Search ..................... 395/309, 449, 395/496, 427, 287, 444, 474–478, 494, 428, 311; 364/200; 365/145

[56] References Cited

U.S. PATENT DOCUMENTS

| | | | |
|---|---|---|---|
| 4,698,748 | 10/1987 | Juzswik et al. | 364/200 |
| 5,280,598 | 1/1994 | Osaki et al. | 395/425 |
| 5,495,453 | 2/1996 | Wociechowski et al. | 365/185.18 |
| 5,526,508 | 6/1996 | Park et al. | 395/449 |
| 5,642,313 | 6/1997 | Ferris | 365/185.25 |
| 5,650,741 | 7/1997 | Nakamura et al. | 327/327 |
| 5,748,911 | 5/1998 | Maguire et al. | 395/281 |
| 5,787,307 | 7/1998 | Imoto | 395/836 |

OTHER PUBLICATIONS

Texas Instruments, Low–Voltage Logic, LV, LVC, LCT, and ALVC Families, 1993, pp. 8–13 –8–26 of Ramzi Ammar.

*Primary Examiner*—Meng-Ai T. An
*Assistant Examiner*—Eric S. Thlang

[57] ABSTRACT

A plurality of MOSFET switches, one per bus line, are used to solve the problem of interfacing between two incompatible devices via a single shared bus. The MOSFET switches used are simple, inexpensive, and very fast. The switches perform two primary functions: 1) isolation of two bus sections (possibly for loading reasons); and 2) translation of incompatible voltages transmitted over the bus.

17 Claims, 6 Drawing Sheets

TRANSISTOR SWITCH USED TO ISOLATE BUS DEVICES AND/OR TRANSLATE BUS VOLTAGE LEVELS

FIELD OF THE INVENTION

This invention pertains to the use of one or more transistor switches to isolate bus devices and/or translate bus voltage levels. By utilizing transistor switches as described more fully below, a plurality of devices may be connected to a common bus in spite of the fact that some of the devices may operate within more limited voltage ranges than others, and in spite of the fact that some of the devices are adversely impacted by bus loading.

BACKGROUND OF THE INVENTION

With each new generation of integrated circuit (IC) development, more and more functionality is being integrated into a single IC. In general, integration leads to smaller ICs, better performance, and lower production costs. However, a reduction in IC size and production cost is often limited by the lack of cost effective IC packaging techniques. As a result, designers are always looking for ways to minimize the number of IC pins associated with a given device. A reduction in the number of IC package pins may be effected by 1) limiting functionality, or 2) sharing functionality.

For example, a simplified Pentium® or Pentium-Pro® computer system 900, 1000 (FIGS. 9 & 10) might comprise a central processing unit (CPU) 902, 1004, a main memory 910, 1008, and a second level cache memory (L2 cache) 904, 1002. The CPU 902, 1004 comprises a single discrete computer chip. The main 910, 1008 and L2 cache 904, 1002 memories are implemented individually and externally to the CPU 902, 1004. While the main memory 910, 1008 stores all of the data used by the CPU 902, 1004, the L2 cache 904, 1002 only stores a copy of recently used processor data. The L2 cache 904, 1002 is significantly smaller than the main memory 910, 1008, and as a result, can be accessed significantly faster.

To allow interfacing between the CPU 902, 1004, main memory 910, 1008 and L2 cache 904, 1002, a data bus 912 or buses 1010–1014 must exist between the CPU 902, 1004 and main memory 910, 1008, and between the CPU 902, 1004 and L2 cache 904, 1002. These buses 912, 1010–1014 are typically fairly wide (a width of 128 bits being quite common). Due to the IC packaging limitations discussed above, dedicating 128 IC pins for connecting these buses to the integrated circuit package comprising the CPU 902, 1004 may be impractical, or possibly just not within budget.

If the main memory and L2 cache buses could be shared, a significant reduction in IC pin count would result. However, two problems exist. First, the main memory data bus 912, 1012–1014 is typically heavily loaded (one to sixteen loads per line is common). The drivers of an L2 cache 904, 1002 are simply unable to drive this heavy of a load while maintaining their high speed accessibility.

Second, the decreasing geometries of CPUs and cache memories have resulted not only in smaller devices, but in devices with more limited voltage tolerances (voltage tolerance being a function of device geometry). Devices with smaller geometries are faster, and cheaper to make. However, their more limited voltage tolerance has often made the task of interfacing new and old devices difficult. For example, on one hand, an older, larger transistor found within a block of main memory might drive a logic high to 5.0 volts, whereas the smaller transistors of a newly manufactured cache might only drive a logic high to 3.3 volts (and be tolerable to receiving a maximum voltage of 3.3 volts). On the other hand, most all devices, new and old, will drive a logic low towards zero volts. A compatibility problem therefore exists at the high end of the voltage spectrum. If a high voltage device drives a line shared with a low voltage device in excess of the low voltage device's tolerance levels, the low voltage device can be seriously damaged.

In the past, components operating at various voltage levels have been connected to a common line or bus via a series of complex voltage translators (possibly contained within the buffer of FIG. 9). However, translators are costly, and typically impose a significant delay, thereby decreasing system performance.

It is therefore a primary object of this invention to provide methods and apparatus for isolating and/or translating voltage levels transmitted across a bus connecting a plurality of devices external to an IC package to a device internal to the IC package.

It is a further object of this invention to provide methods and apparatus which allow pins of an IC package to be shared among functional devices, thereby reducing an IC package's required pin count.

It is also an object of this invention to provide methods and apparatus which allow any plurality of devices to be connected to a common bus, regardless of the range of voltages used by each of the plurality of devices.

SUMMARY OF THE INVENTION

In the achievement of the foregoing objects, the inventor has devised methods and apparatus utilizing a transistor switch to perform the dual function of 1) isolating various voltages transmitted across a bus, and 2) translating voltages transmitted across a bus. In general, a simple transistor switch comprising a single MOSFET (metal-oxide semiconductor field effect transistor) is serially connected in each line of a bus. The voltage applied to the gate of each MOSFET is regulated so as to alternately isolate two sections of the bus, or translate voltages transmitted over the bus.

For example, in comparison with the simplified Pentium® and Pentium-Pro® computer architectures (FIGS. 9, 10) disclosed above, a single bus line 208 (FIG. 2) might connect both main memory 206 and an L2 cache 204 to a CPU 202. This design 200 is advantageous over the Pentium-Pro® design 1000 in that it reduces the number of CPU package pins required to interface with the bus by nearly half. The design 200 is advantageous over the Pentium® 900 design in that 1) error correction hardware can be shared between the L2 cache 204 and main memory 206 (memory control and error correction are integrated into the CPU in FIG. 2), and 2) the slow and costly buffer 908 of FIG. 9 can be eliminated.

Each line of the FIG. 2 bus 208 comprises a MOSFET switch which is serially connected to the bus 208 at a point in between points where the main memory 206 and L2 cache 204 connect to the bus 208. The serial connection points for a MOSFET are its source and drain. The gate of each MOSFET is connected to a voltage regulator which is controlled via an ENABLE signal emitted by the CPU 202.

In operation, the voltage regulator applies alternating voltages to the gate of each MOSFET switch. When the CPU 202 is retrieving data from the L2 cache 204, a voltage is applied to each gate so as to open the MOSFET switches. This serves to isolate the main memory 206 from the L2 cache 204 so that the drivers of the L2 cache 204 do not have to overcome the heavy loads put on the bus 208 by main memory 206, and data may be driven out of the L2 cache 204 more quickly.

When the CPU 202 is receiving data from main memory 206, a voltage is applied to each gate so as to close the MOSFET switches. The applied voltage is selected such that higher voltage levels transmitted from main memory cells are attenuated as they pass through the switches, the attenuation being to a voltage level which is tolerated by the L2 cache 204.

The above apparatus may therefore be used to share a bus between a plurality of devices operating within various voltage ranges.

Furthermore, and in the configuration described above, the apparatus may be used to update an L2 cache 204 "on the fly" as data is read from main memory 206, thereby eliminating a need for separate cache update cycles.

The MOSFET switches are extremely fast, and the time required to open or close a switch may be hidden within normal memory access times.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 1:
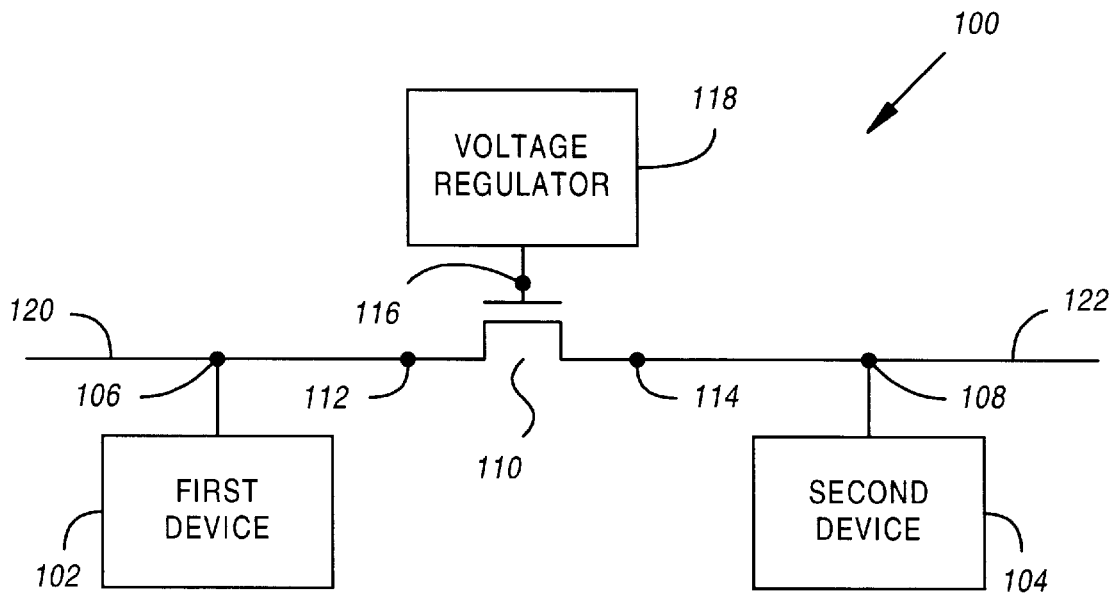
FIG. 1 is a schematic illustrating a transistor switch, serially connected in a shared bus line.

Apparatus 100, 200, 300, 400, 500, 600, 700 and methods 800 which utilize transistor switches 110 to isolate bus devices 102, 104 and/or translate bus voltage levels are pictured in FIGS. 1–8. The apparatus 100 (FIG. 1) may generally comprise a shared data bus 120, 122, to which is connected a plurality of devices comprising at least first 102 and second devices 104. A number of field effect transistors 110 are serially connected in lines of the bus 120, 122 such that each transistor 110 bridges a single line of the bus 120, 122 via its source 112 and drain 114 terminals. The points at which the transistors 110 bridge lines of the bus 120, 122 lie in between points 106, 108 where the first 102 and second 104 devices connect to the bus 120, 122. The apparatus 100 also comprises at least one voltage regulator 118, wherein each voltage regulator 118 is connected to one or more gate terminals 116 of the number of field effect transistors 110.

Consistent with the above apparatus 100, a method of selectively isolating a high speed access memory 302 (FIG. 3) from a heavily loaded memory 304 (i.e., a memory 304 that places a heavy load on the bus 320, 322 to which it is attached) may generally comprise the steps of, 1) connecting the high speed access and heavily loaded memories 302, 304 to a common bus 320, 322, 2) bridging each line of the common bus 320, 322 with a field effect transistor switch 310, and 3) when transmitting data from said high speed access memory 302, opening each field effect transistor switch 310 by applying an appropriate voltage to its gate terminal 316. The field effect transistors 310 bridge lines of the bus 320, 322 at points in between points 306, 308 where the high speed access memory 302 and heavily loaded memory 304 are connected to the bus 320, 322, and each bridge is formed via connections to the source 312 and drain 314 terminals of a single field effect transistor 310.

Also consistent with the above apparatus 100 (FIG. 1), a method of updating a cache memory 302 (FIG. 3) while reading main memory 304 may generally comprise the steps of, 1) connecting the cache memory 302 and main memory 304 to a common bus 320, 322, 2) bridging each line of the common bus 320, 322 with a field effect transistor switch 310, and 3) closing each field effect transistor switch 310 by applying an appropriate voltage to its gate terminal 316. The field effect transistors 310 bridge lines of the bus 320, 322 at points in between points 306, 308 where the cache memory 302 and main memory 304 are connected to the bus 320, 322, and each bridge is formed via connections to the source 312 and drain 314 terminals of a single field effect transistor 310. Finally, and substantially simultaneously, the output buffers of the cache memory 302 are disabled, the input buffers of the cache memory 302 are enabled, and lines of the common bus 320, 322 are driven with data stored in main memory 304.

A method of transmitting data across a common bus 120, 122 (FIG. 1) connected to a plurality of devices 102, 104 is also disclosed. The method generally commences with the step of bridging each line of the bus 120, 122 with a field effect transistor switch 110. The field effect transistors 110 bridge lines of the bus 120, 122 at points in between points 106, 108 where first 102 and second 104 devices are connected to the bus 120, 122, and each bridge is formed via connections to the source 112 and drain 114 terminals of a single field effect transistor 110. Before the first device 102 transmits 804 (FIG. 8) data across the common bus 120, 122, each field effect transistor switch 110 is opened 806 by applying a first voltage to its gate terminal 116. Before the second device 104 transmits 808 data across the common bus 120, 122, each field effect transistor switch 110 is closed 810 by applying a second voltage to its gate terminal.

Having thus described apparatus 100, 300 and methods which utilize transistor switches 110 to isolate bus devices 102, 104 and/or translate bus voltage levels in general, the apparatus 100, 300 and methods 800 will now be described in further detail.

In a first preferred embodiment, apparatus 100 (FIG. 1) for isolating bus devices 102, 104 and/or translating bus voltage levels may comprise a bus 120, 122, and first 102 and second 104 devices connected to the bus 120, 122. [NOTE: In one embodiment, each of the first 102 and second 104 devices can comprise multiple devices (e.g., see FIG. 4).] Note that although the bus 120, 122 of FIG. 1 comprises only a single bus line 120, 122, the teachings of this disclosure are not so limited, and may be aptly applied to a multiple line bus system (e.g., see FIG. 6).

A field effect transistor (FET) 110 bridges the bus 120, 122 at a point in between points 106, 108 where the first 102 and second 104 devices connect to the bus 120, 122. The FET's source 112 and drain 114 terminals serve as connecting points for the FET bridge 110. At times in this description, such a FET 110 may be referred to as being "serially connected" in a bus line 120, 122. A voltage regulator 118 is connected to the gate terminal 116 of the FET 110.

In operation, the first 102 and second 104 devices may alternately receive data from, or write data to, the bus 120, 122. However, for reasons which will become more apparent below, it may be desirable to either 1) isolate one of the devices 102 from the other 104, or 2) translate voltages transmitted across the bus 120, 122 so that one or more devices 102 see certain bus voltages (i.e., certain voltages placed on the bus by another device 104) in attenuated form. These two functions, isolation and translation, may be performed using a single transistor switch (one in each line of a bus) such as the FET 110 shown in FIG. 1.

For example, assume that the first device 102 places a light load on the bus 120, 122 and the second device 104 places a heavy load on the bus 120, 122. If an output driver of the first device 102 is designed to quickly drive a low capacitance, lightly loaded bus line, it might have difficulty (be slow) driving a heavily loaded bus 120, 122 "at speed" (i.e., without significant delay). Such is the case when the first 102 and second 104 devices are both connected to the bus 120, 122, and signals are allowed to flow freely across the FET bridge 110. However, when the FET switch 110 is opened, the left-most portion of the bus 120 is isolated from the right-most portion of the bus 122, thereby reducing the load on the left-most portion of the bus 120. In this manner, an output driver of the first device 102 may quickly drive the left-most portion of the bus 120 to a desired voltage. This voltage may in turn be received by other devices (not shown) connected to the left-most end 120 of the bus 120, 122.

Alternatively (or additionally), assume that the first device 102 is a 3.3 V device, and the second device 104 is a 5.0 V device. The 3.3 V device 102 will transmit and receive voltages via the bus in the range of 0–3.3 V. The 5.0 V device 104 will transmit and receive voltages via the bus in the range of 0–5.0 V. However, if the 3.3 V device 102 is allowed to "see" all voltages transmitted by the 5.0 V device 104, those voltages transmitted in excess of 3.3 V could damage the 3.3 V device 102. To prevent such a situation from occurring, the bridging FET 110 is preferably an n-channel FET (NFET) having a gate voltage of 4.3 V. Assuming a standard MOSFET (metal-oxide semiconductor field effect transistor) gate-to-source voltage drop of 1.0 V, any voltage transmitted across the bus 120, 122 which exceeds 3.3 V will be attenuated as it passes through the FET bridge 110. In this manner, the bridging FET 110 operates as a voltage translator, and the 3.3 V device 102 never "sees" a voltage in excess of 3.3 V.

The above apparatus is particularly useful in busing data to and from memory in a computer system, since main memory 206, 304 (FIGS. 2, 3) typically lags behind cache memory 204, 302 and CPU components 202, 328 in incorporating new technology. Whereas main memory 206, 304 might comprise older 5.0 V transistors, cache memory 204, 302 might comprise newer, faster 3.0 V transistors. Furthermore, a main memory bus 320, 322 is often more heavily loaded than a cache memory bus 320. While a cache memory 204, 302 may place only a single load (denoted by the single RAM CELL 402 connected to the left-most portion of the bus 320, 322 in FIG. 4) on a bus line 320, main memory 206, 304 might place from one to sixteen loads 404–410 on a bus line 320, 322. The apparatus of FIG. 1 is therefore well-suited for busing data between a CPU 202 and one or more external memories 204, 206.

Figure 2:
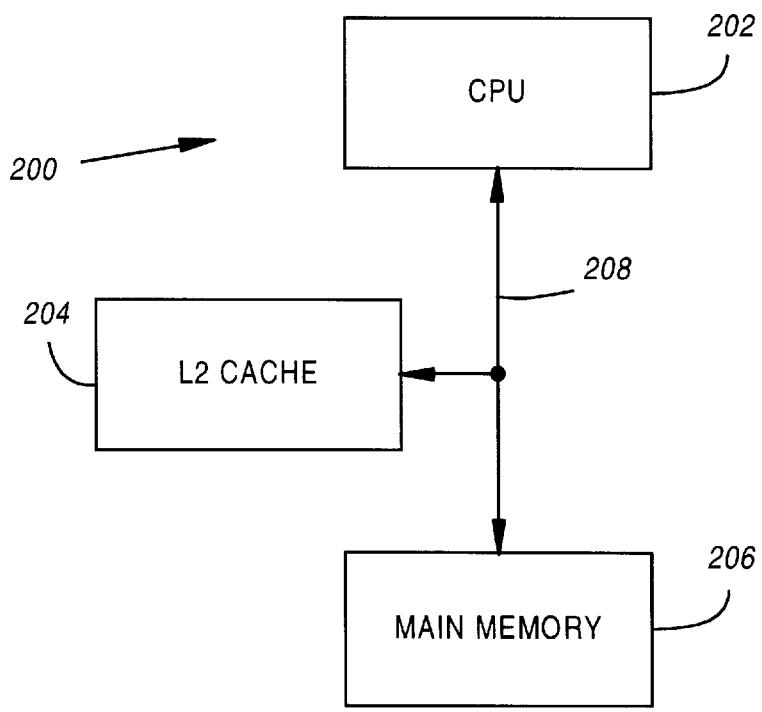
FIG. 2 is a schematic illustrating a simplified computer system in which the FIG. 1 apparatus might be implemented.
Figure 3:
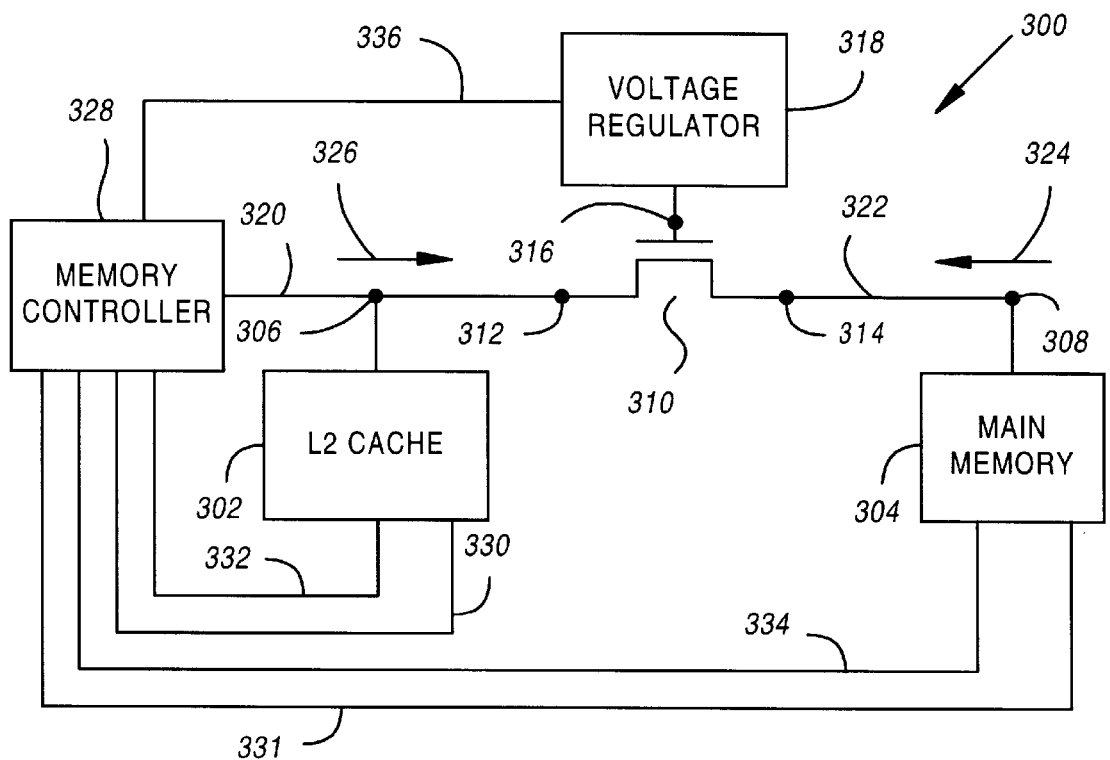
FIG. 3 is a schematic illustrating a MOSFET switch, serially connected in a bus line shared by the L2 cache and main memory components of the FIG. 2 computer system.
Figure 4:
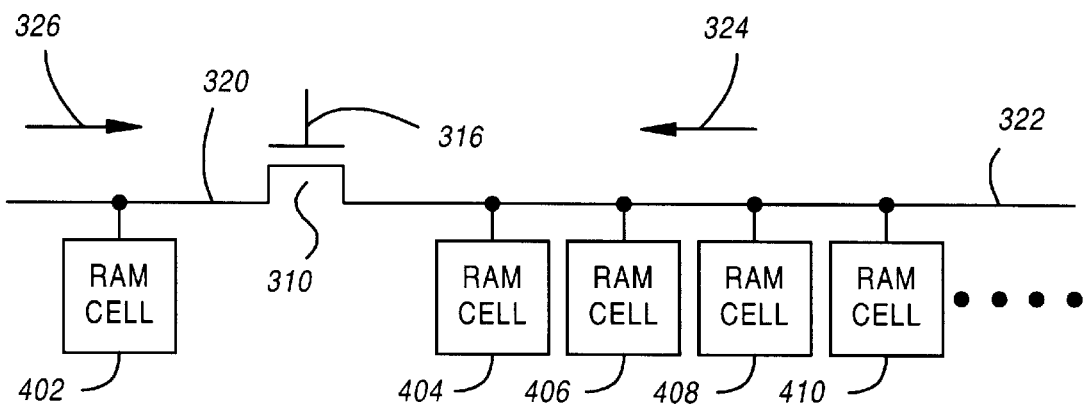
FIG. 4 is a schematic, similar to that of FIG. 3, illustrating a heavily loaded main memory bus line.
Figure 9:
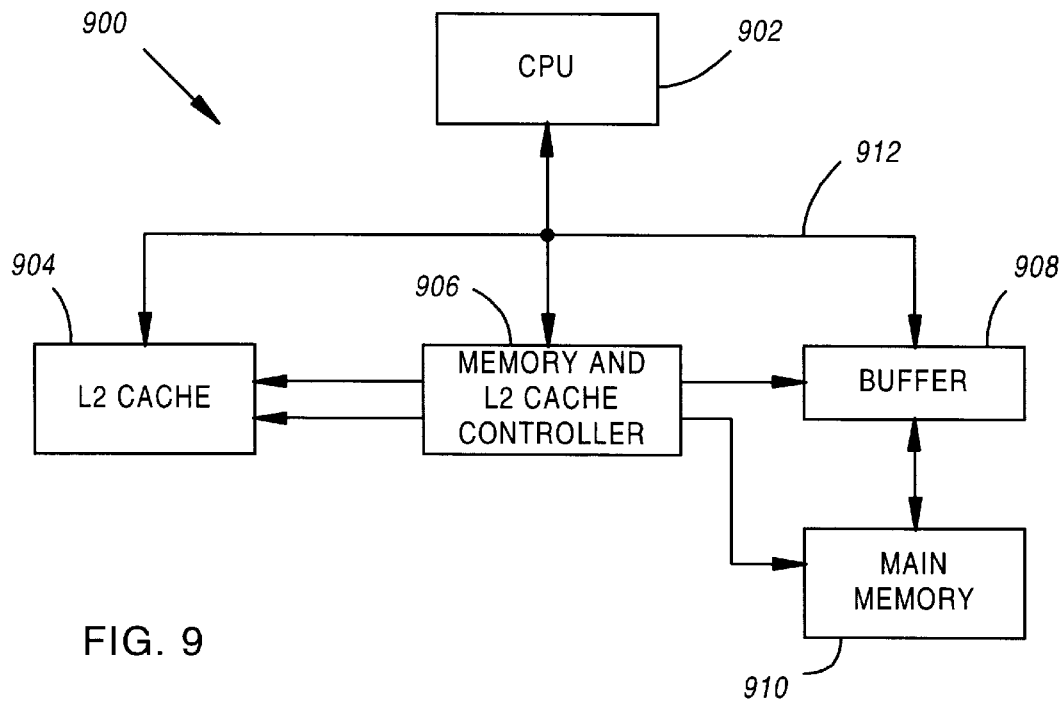
FIG. 9 is a schematic illustrating a conventional Pentium® CPU connected to external memory devices.

A simple computer 200 embodying the apparatus 100 of FIG. 1 is shown in FIGS. 2 and 3. The computer 200 may comprise a CPU (central processing unit) 202; a secondary level cache (L2 cache) 204, external to the CPU 202; and a main memory 206, also external to the CPU 202. Unlike the conventional computer architecture 1000 of FIG. 10, the CPU 202 of FIG. 2 requires only a single shared bus 208 to access both cache 204 and main 206 memory. As a result, the number of CPU package pins which are required to interface with a number of 64 bit memories 206 is limited to 64 data lines plus lines required for addressing and control. Since IC packaging techniques place a premium on the use of available IC package pins, the computer architecture 200 of FIG. 2 is preferred over the architecture 1000 of FIG. 10 (that is, from a pure manufacturing standpoint). The FIG. 2 computer architecture 200 is also preferred over the FIG. 9 architecture 900. However, an explanation of why will be presented later in this description.

FIG. 3 provides further details of the FIG. 2 computer system 200. The most noticeable difference between the apparatus 100, 300 of FIGS. 1 and 3 is the presence of a memory controller 328 in FIG. 3. This memory controller 328 is preferably implemented on-board the CPU's integrated package. The L2 cache 302 and main memory 304 are connected to a common bus 320, 322 which is received by the memory controller 328. Again, only a single bus line 320, 322 is shown, but in reality, a plurality of bus lines will most likely exist. Each line of the bus 320, 322 is bridged by a FET 310, at a point in between points 306, 308 where the L2 cache 302 and main memory 304 connect to the bus 320, 322. The bridging FETs 310 may be either n-channel or p-channel, and are preferably MOSFETS. NFETs are preferred because they are fundamentally faster at switching than are PFETs. Furthermore, NFETs are amenable to providing the voltage translation desired in the preferred embodiment.

The source 312 and drain 314 terminals of a FET 310 serve as bridge connecting points. One or more voltage regulators 318 drive the gate terminals 316 of the bridging FETs 310. In a typical configuration, a single voltage regulator 318 might drive the gate terminals 316 of eight or so bridging FETs 310. The voltage regulators 318 receive control signals (i.e., enable signals) from the memory controller 328, and each 318 is connected thereto via a simple logic (i.e., high/low level) control line 336.

In addition to sending and receiving data via the bus 320, 322, the memory controller 328 sends memory addresses to the L2 cache 302 and main memory 304 via a pair of address buses 330, 331, and emits various memory control signals. A first control signal is the voltage regulator enable signal referred to above. A second control signal causes the L2 cache to initiate a cache update cycle. In addition, a first pair of signals determines when read or write cycles will be initiated within the cache 302, and another pair of signals determines when read or write cycles will be initiated within main memory 304. Other signals may be generated by the memory controller 328 but they are not relevant to this description.

In a preferred embodiment, the memory controller 328 is programmed to open 802 (FIG. 8) bus switches 310 by default (i.e., when the memory controller 328 is idle, switches 310 are opened). Since FET switches 310 turn "ON" and "OFF" relatively slowly (on the order of nine nanoseconds), opening FET switches 310 by default ensures that L2 cache accesses will not be slowed due to FET switching. Although FET switches 310 must be closed prior to a main memory access, main memory accesses are significantly slower than L2 cache accesses. FET switches 310 may therefore be closed 812 before main memory 304 is capable of driving 814 the bus 320, 322 (in effect hiding the switching time). Once closed, data may flow through a FET switch 310 very quickly (on the order of one nanosecond). As a result, very little penalty is associated with the use of FET switches 310. On the other hand, conventional bus sharing techniques incorporating bidirectional buffers suffer a much greater penalty (and are more costly to implement).

In accordance with the preferred embodiment outlined above, a memory read transaction 800 might proceed as follows. Several states after a memory controller 328 drives 804 a requested memory address to the address buses 330, 331, the memory controller 328 determines 808 whether data associated with the memory address is stored in the L2 cache 302. If it is, the memory controller 328 abandons 810 its main memory access. If not, the memory controller 328 continues 812–814 its access of main memory 304, disables 812 the L2 cache 302 output buffers, and closes 812 the bus switches 310.

Upon receiving a memory address, the L2 cache 302 places 806 data corresponding to the requested memory address on the bus 320. The memory controller 328 then proceeds to perform a "hit" comparison. If a "hit" is indicated 808, devices (e.g., a processor or first level cache, not shown) are provided with the data driven to the bus 320 by the L2 cache 302. If a "miss" is indicated 808, data on the bus 320 is abandoned, and an access 812–814 of main memory proceeds. Since bus switches 310 are opened 802 by default, the L2 cache's output drivers do not need to overcome the heavy loads placed on the bus 320, 322 by main memory 304.

If data is found in the L2 cache 302, the memory controller 328 abandons its main memory access 810. If data is not found in the L2 cache 302, then it is read from main memory 304. As main memory 304 is being accessed, the memory controller 328 emits a signal over the voltage regulator control line 336 which causes the voltage regulator 318 to close 812 the FET switches 310. Although the FET switches transition from open to close rather slowly, main memories 304 require even more time to transmit 814 requested data. For example, as earlier stated, the closing 812 of a switch 310 may take nine nanoseconds. However it might take fifteen nanoseconds to drive 814 data in main memory 304 to the bus 320, 322. As a result, the FET switches 310 may be closed 812 in parallel with a main memory access. In this manner, FET switching is hidden, and switching times do not add delay to a memory access.

The voltage which is applied to the bridging FETs 310 during a read of main memory 304 is carefully regulated so that 1) voltage translations occur within each of the bridging FETs, and 2) the voltage on the left-most portion of the bus 320 does not exceed the voltage ranges under which the memory controller 328 and L2 cache 302 operate.

For example, assume that the memory controller 328 and L2 cache 302 are 3.3 V devices, and the main memory 304 is a 5.0 V DRAM (dynamic random access memory). For conventional 3.3 V and 5.0 V devices, logic low thresholds stand at about 0.8 V, and logic high thresholds stand at about 2.0 V. In other words, any voltage below 0.8 V is recognized as a logic low, and any voltage in excess of 2.0 V is recognized as a logic high. Any voltage between 0.8 V–2.0 V is indeterminate.

When pulling a bus line to a logic low, both 3.3 V and 5.0 V devices will tend to pull a line to zero volts. However, when pulling a bus line to a logic high, a 3.3 V device will pull the line to approximately 3.0 V, and a 5.0 V device will pull the line to approximately 4.5 V.

Since a logic high of 4.5 V exceeds the voltage tolerances of both the L2 cache 302 and memory controller 328, it must be attenuated to 3.3 V before arriving at the left-most portion of the bus 320. This may be accomplished by applying a voltage of 3.3 V+$V_{GS}$ to the gate terminals 316 of the bridging FETs 310. $V_{GS}$ is a FET's gate-to-source voltage. Typically, this voltage drop will be in the range of 0.6 V–1.0 V. Assuming that $V_{GS}$ is 1.0 V, 4.3 V must be applied to the gate 316 of each bridging FET 310. Thus, when an appropriate signal is placed on the voltage regulator enable line 336, the voltage regulator must deliver 4.3 V to each of the gates 316 to which it is connected.

An additional advantage provided by the FIG. 3 apparatus 300 is that the L2 cache 302 may be updated 816 (FIG. 8) as memory read data is flowing from main memory 304 to the memory controller 328. This eliminates the need for initiating distinct L2 cache 302 update cycles, as is required in the Pentium-Pro® computer architecture of FIG. 10. A control signal is merely provided to the L2 cache 302 as data is being read from main memory 304, and simultaneously with the read of main memory 304, data is written to the L2 cache 302. Due to the voltage translation provided by the bridging FETs 310, data being read from main memory 304 will not damage the L2 cache 302. If an error is detected in the data, then an appropriate cache line is subsequently marked invalid.

Figure 10:
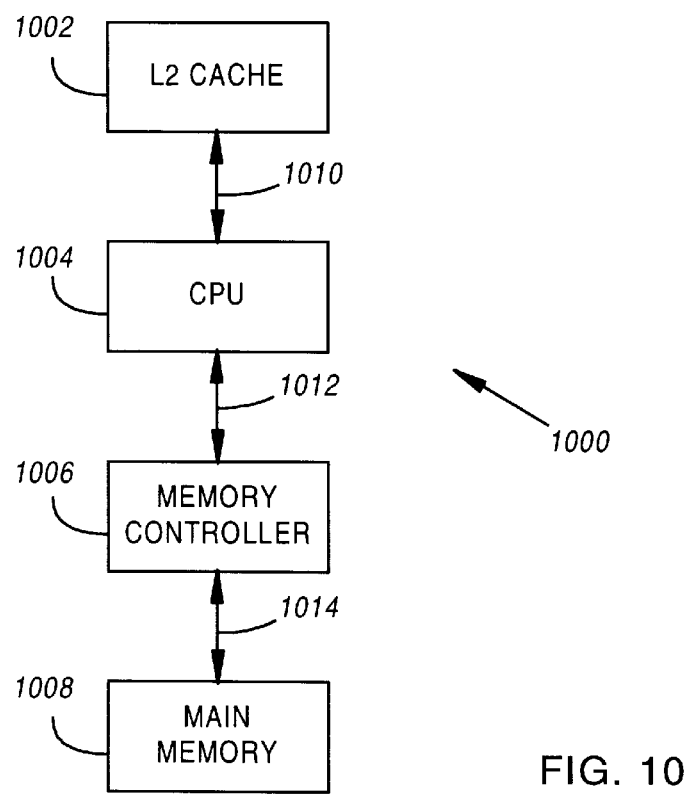
FIG. 10 is a schematic illustrating a conventional Pentium-Pro® CPU connected to external memory devices.

Another advantage which the FIG. 3 apparatus 300 provides over previous computer architectures 900, 1000 is an ability to share error correction circuitry between the L2 cache 302 and main memory 304. Previously, L2 cache data has not been received through error correction circuitry. For example, error correction circuitry of the FIG. 9 apparatus 900 is embodied in the main memory buffer 908. As such, error correction can only be applied to data from main memory 910. In the FIG. 10 apparatus 1000, error correction circuitry is embodied in the memory controller 1006. One can easily appreciate that the L2 cache 1002 of FIG. 10 provides data directly to the CPU 1004 and has no connection with the main memory controller 1006. Error correction can only be applied to the L2 cache 1002 of FIG. 10 by implementing another error correction circuit internal to the CPU 1004, or somewhere within the path 910 connecting the L2 cache 1002 to the CPU 1004.

In addition to reading from external memory 302, 304 via the bus 320, 322, data may also be received by external memory 302, 304 via the bus 320, 322. Note that after applying a conduction inducing voltage to the gates 316 of the bridging FETs 310, voltages may traverse the bridging FETs 310 in either direction 324, 326. As a result, "logic high" data placed on the bus 320, 322 via the memory controller 328 will traverse the bridging FETs at a level of 3.0 V. Since 5.0 V devices 304 will recognize any voltage in excess of 2.0 V as a logic high, there is no need to "step up" the 3.0 V voltages. Logic lows are similarly unaffected as they traverse the bus 320, 322 from the memory controller 328 to main memory 304.

Figure 5:
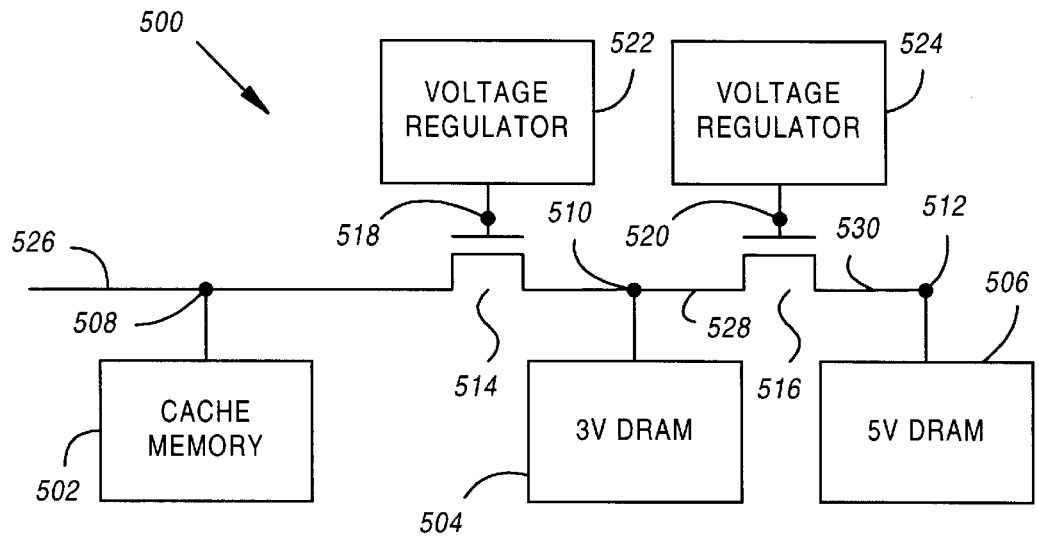
FIG. 5 is a schematic illustrating a plurality of transistor switches, serially connected at various points in a shared bus line.

Additional bridging FETs 520 (FIG. 5) may be used to connect any number of additional devices 506 to a shared memory bus 526, 528, 530. FIG. 5 shows apparatus 500 which is in many ways similar to the apparatus 300 of FIG. 3. The apparatus 500 comprises a cache memory 502; main memory 504, 506; a bridging FET 514, serially connected in each line of the bus 526, 528 connecting cache 502 and main 504 memory; and a voltage regulator 522 which regulates the gate voltages of each bridging FET 514. However, note that the main memory 504, 506 comprises both 3 V DRAM 504 and 5 V DRAM 506. Since these two memory devices 504, 506 are inherently incompatible, additional bridging FETs 516 are connected between points 510, 512 where the 3 V and 5 V DRAMs 504, 506 connect to the bus 526, 528, 530. The gate terminals 520 of these additional FETs 516 are regulated by one or more additional voltage regulators 524. It is possible that the voltage regulators 522, 524 of FIG. 5 could be synonymous. However, it is most likely that they would be distinctly embodied, so that two or more sets of bridging FETs 514, 516 could be individually controlled. Note that in FIG. 5, the additional bridging FETs 516 serve to translate voltages, while the first number of bridging FETs 514 only serve to isolate the cache memory 502 from the loads of main memory 504, 506. Also note, that the connecting points 510, 512 for the 3 V and 5 V DRAMs 504, 506 could easily be swapped due to the bidirectional voltage translation offered by each of the bridging FETs 514, 516. If the 3 V and 5 V DRAMs are swapped, the left-most bridging FETs 514 will again serve a translation and isolation function, and the right-most bridging FETs will continue to provide voltage translations.

Figure 6:
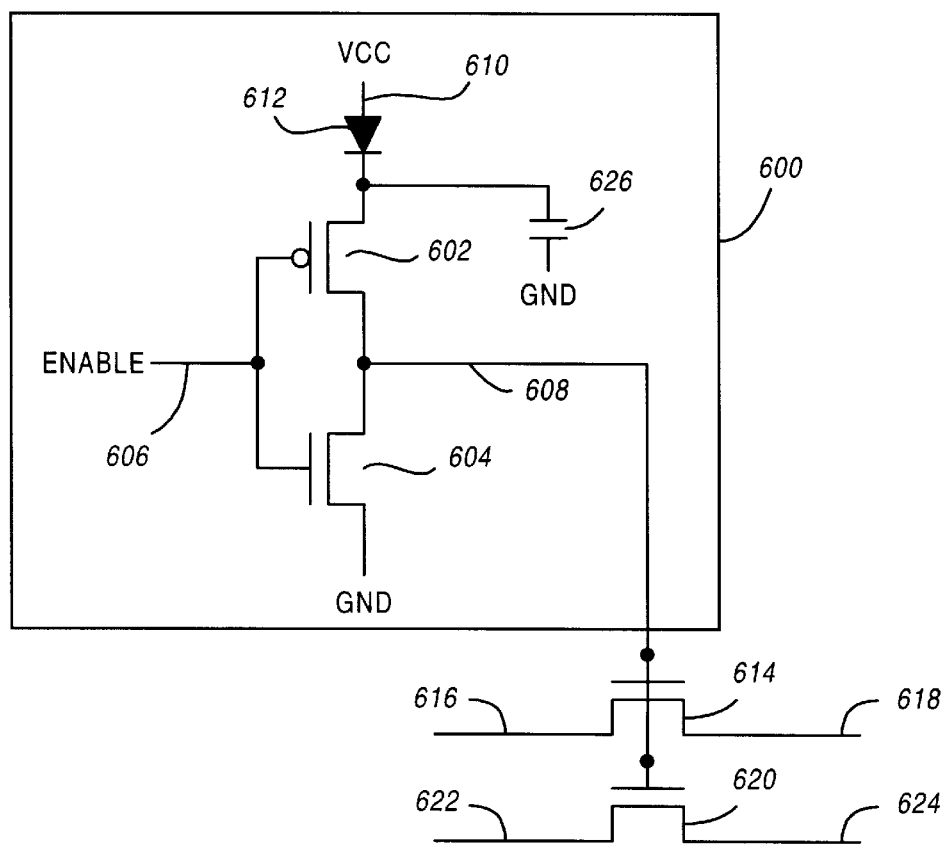
FIG. 6 is a schematic illustrating an embodiment of the internal components of any of the voltage regulators shown in FIGS. 1, 3 or 5.

FIG. 6 illustrates a first embodiment of a voltage regulator 600, 318, 522, 524. The regulator 600 comprises a buffer, which in turn comprises a powered PFET 602 connected in series with a grounded NFET 604. The gate terminals of the two FETs 602, 604 are driven by an ENABLE signal 606 received from a memory controller 328 or the like. The output 608 of the buffer serves to drive the gate terminals of one or more NFETs 614, 620 which bridge a plurality of bus lines 616/618, 622/624. The voltage regulator's PFET 602 receives its power, VCC 610, through a diode 612. A power supply bypass cap 626 extends from the node joining the diode 612 and PFET 602 and serves to attenuate switching noise. In operation, VCC 610 is derived from a constant 5 V power supply. This voltage is reduced by approximately 0.7 V as it traverses the diode 612. When the ENABLE signal 606 is at a logic low, 4.3 V passes through the buffer and is supplied to the gate of each bridging FET 614, 620 to which the voltage regulator 600 is connected. If each bridging FET 614, 620 is presumed to have a gate-to-source voltage drop, $V_{GS}$, of 1.0 V, the maximum voltage which can pass through a bridging FET (from source to drain) is limited to 3.3 V.

If, on the other hand, ENABLE 606 is at a logic high, the gate terminals of the bridging FETs 614, 620 will be grounded, and a very high impedance will exist between the source and drain of each bridging FET 614, 620. As a result, each bridging FET 614, 620 will isolate left 616, 622 and right 618, 624 portions of the bus lines to which they are connected.

The switching apparatus of FIG. 6 may be purchased "off the shelf" as Texas Instruments part #74CBT16211. The 74CBT16211 includes all of the elements of FIG. 6, but for the diode 612 and bus lines 616/618, 622/624.

Figure 7:
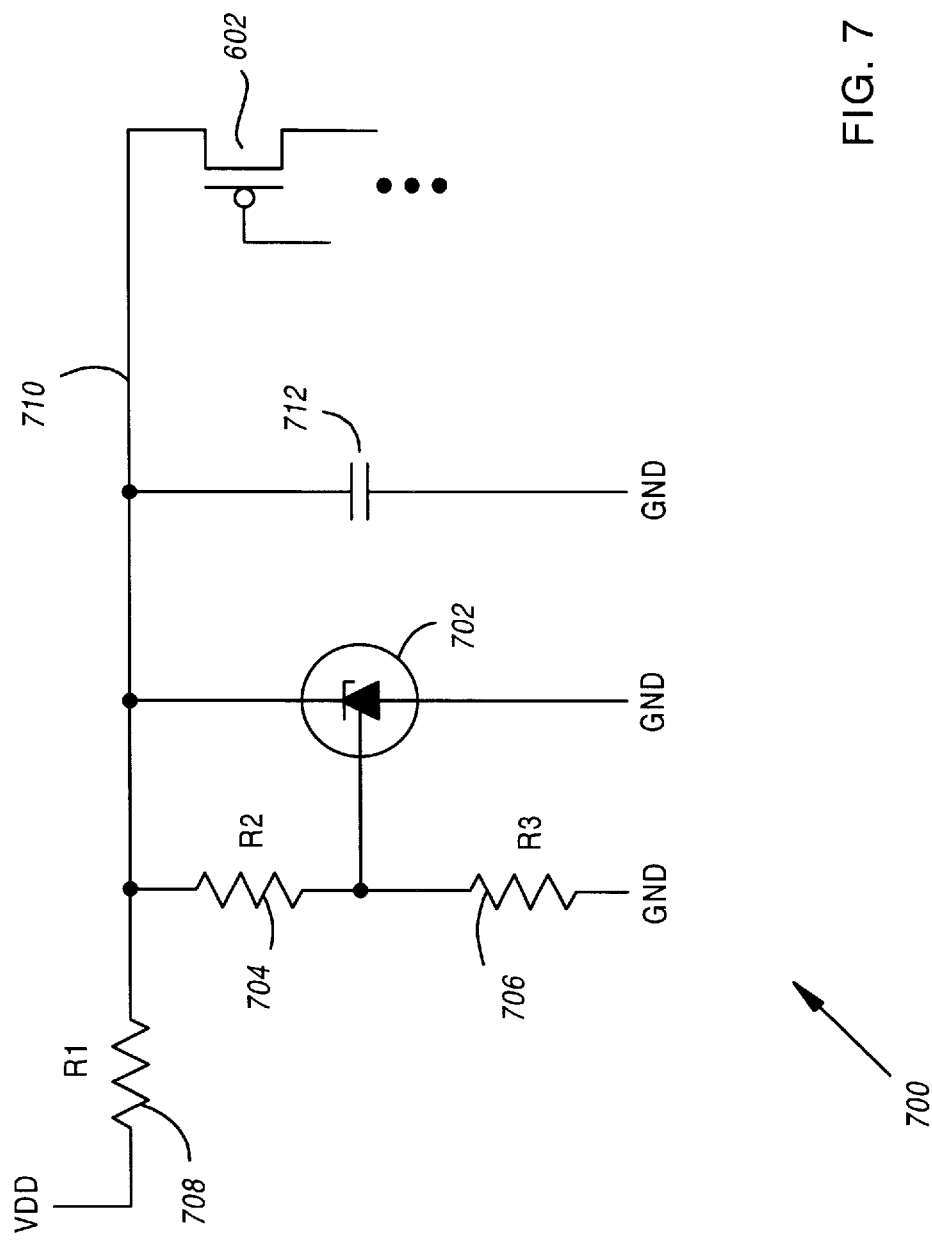
FIG. 7 is a schematic illustrating a variation to the voltage regulator shown in FIG. 6.
Figure 8:
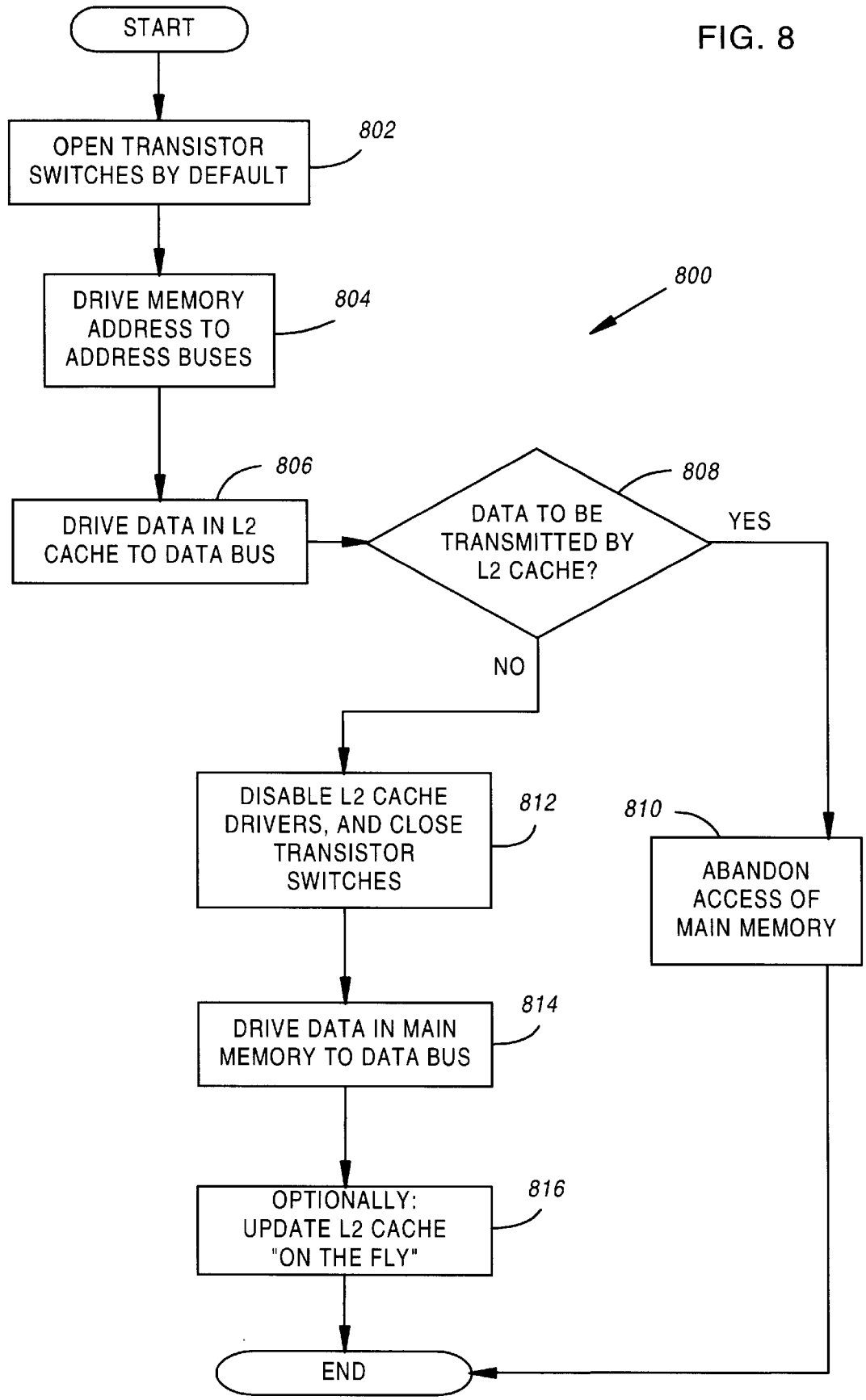
FIG. 8 is a flow chart illustrating steps performed during a memory read transaction conducted via a bus line having a transistor switch as shown in FIG. 3.

Rather than applying power to the PFET 602 of FIG. 6 via a diode 612, power could be applied to the PFET 602 via the apparatus 700 of FIG. 7. The apparatus 700 comprises a shunt regulator 702 (such as Texas Instruments part #TL431CD), a voltage divider comprising resistors R2 704 and R3 706, resistor R1 708, and a power supply bypass cap 712 comprising one or more capacitors connected in parallel (only one of which is shown in FIG. 7). The apparatus 700 maintains a fixed voltage at the node joining resistors R2 704 and R3 706. For a given voltage at that node, resistors R2 704 and R3 706 operate as a voltage divider, and are selected so that a desired voltage (e.g., 4.3 V) is provided to the PFET 602 of FIG. 6. In other words, the shunt regulator 702 changes the resistance between ground and a regulated voltage line 710 such that a voltage drop across resistor R1 708 produces a desired voltage on line 710. The regulated line 710 is connected to the source/drain of the FIG. 6 PFET 602. Resistors R2 704 and R3 706 provide feedback to the shunt regulator 702 and give a designer precise control over the regulated voltage. The power supply bypass cap 712 again serves to attenuate switching noise.

When an NFET bridge 310 (FIG. 3) is on (i.e., conducting), data flows from its source 312 to drain 314 very quickly—in less than one nanosecond. The latency increase for reading and writing main memory 304 is therefore negligible. As described above, an NFET bridge may be turned on in approximately nine nanoseconds. However, the turn on time may be easily hidden during a conventional memory access cycle.

If desired, a bidirectional buffer could be substituted for each bridging FET 310. However, a bidirectional buffer is much more complicated to control since differing control signals must be generated in response to the direction 324, 326 of data flow on a bus 320, 322. Furthermore, bidirectional buffer tri-states would add significantly more delay to data transfer times.

In summary, a plurality of MOSFET switches 110 (FIG. 1), one per bus line 120, 122, are used to solve the problem of interfacing with two incompatible devices 102, 104. The MOSFET switches 110 used are simple, inexpensive, and very fast. As a result, they are particularly suited for isolating two bus sections and/or translating voltages transmitted over a bus.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Simplified apparatus for transmitting data to and from a plurality of incompatible devices via a common bus, and for allowing each of the plurality of incompatible devices to receive data transmitted to or from another of the plurality of incompatible devices, the apparatus comprising:

a) a shared data bus;
   b) a plurality of devices connected to the shared data bus, the plurality of devices comprising at least first and second devices;
   c) a number of field effect transistors having source and drain terminals, wherein each of the number of field effect transistors bridges a single line of the shared data bus view said source and drain terminals, at a point in between points where the first and second devices connect to the shared data bus; and
   d) at least one voltage regulator, each of the at least one voltage regulators being connected to one or more gate terminals of the number of field effect transistors.

2. Apparatus as in claim 1, further comprising a controller, wherein the controller is connected to:
a) the shared data bus;
b) each of the at least one voltage regulators; and
c) each of the plurality of devices connected to the shared data bus;
wherein the controller may regulate the configuration of, and flow of data over, the shared data bus.

3. Apparatus as in claim 2, wherein:
a) the first device is a cache memory;
b) the second device is a main memory; and
c) the controller is a memory controller.

4. Apparatus as in claim 3, wherein:
a) the first device places a heavy load on the shared data bus; and
b) the second device places a light load on the shared data bus.

5. Apparatus as in claim 3, wherein:
a) the memory controller and cache memory are 3.3 V components; and
b) the main memory is a 5 V component.

6. Apparatus as in claim 3 wherein each of the number of field effect transistors is a metal-oxide semiconductor field effect transistor.

7. Apparatus as in claim 1, wherein each of the number of field effect transistors is a metal-oxide semiconductor field effect transistor (MOSFET).

8. Apparatus as in claim 7, wherein each of the MOSFETs is an n-channel MOSFET.

9. Apparatus as in claim 1, further comprising:
additional field effect transistors having source and drain terminals, wherein:
i) each of the additional field effect transistors bridges a single line of the shared data bus via said source and drain
terminals, at a point in between points where various of the plurality of integrated circuit devices connect to the bus, but not in between points where the first and second devices connect to the bus; and
ii) wherein a gate terminal of each additional field effect transistor is connected to one of at least one additional voltage regulators.

10. Apparatus as in claim 1, wherein each of the at least one voltage regulators:
connects to a plurality of gate terminals of the number of field effect transistors, and synchronously regulates a voltage applied to each of the plurality of gate terminals.

11. Apparatus as in claim 1, wherein:
a) the first device places a light load on the shared data bus; and
b) the second device places a heavy load on the shared data bus.

12. Apparatus as in claim 1, wherein each of the at least one voltage regulators comprises:
a) a buffer, the buffer comprising a data input, a data output, and a supply voltage input; and
b) a diode connected between the supply voltage input and a voltage source; wherein:
c) the data output is connected to one or more gate terminals of the number of field effect transistors; and
d) the data input receives an enable signal.

13. A method of selectively isolating a high speed access memory from a heavily loaded memory, the method comprising the steps of:
a) connecting the high speed access and heavily loaded memories to a common bus;
b) bridging each line of the common bus with a field effect transistor switch, at a point in between points where the high speed access memory and heavily loaded memory are connected to the common bus, each bridge being formed via connections to the source and drain terminals of a field effect transistor; and
c) when desiring to isolate the high speed access memory from the heavily loaded memory, opening each field effect transistor switch by applying an appropriate voltage to the gate terminal.

14. A method of updating a cache memory while reading a main memory, the method comprising the steps of:
a) connecting the cache memory and main memory to a common bus;
b) bridging each line of the common bus with a field effect transistor switch, at a point in between points where the cache memory and main memory are connected to the common bus, each bridge being formed via connections to the source and drain terminals of a field effect transistor;
c) when desiring to update the cache memory while reading the main memory:
i) closing each field effect transistor switch by applying an appropriate voltage to the gate terminal; and
ii) substantially simultaneously:
A) disabling output buffers of the cache memory;
B) enabling input buffers of the cache memory; and
C) driving lines of the common bus with data stored in main memory.

15. A method as in claim 14, wherein the step of applying an appropriate voltage to the gate terminal of a field effect transistor switch comprises:
regulating the applied voltage so as to attenuate signals passing through the field effect transistor switch, said attenuation being to a voltage level tolerated by the cache memory.

16. A method of transmitting data across a common bus connected to a plurality of devices, the method comprising the steps of:
a) bridging each line of the common bus with a field effect transistor switch, at a point in between points where first and second devices are connected to the common bus, each bridge being formed via connections to the source and drain terminals of a field effect transistor;
b) before the first device transmits data across the common bus, opening each field effect transistor switch by applying a first voltage to the gate terminal; and
c) before the second device transmits data across the common bus, closing each field effect transistor switch by applying a second voltage to said gate terminal.

17. A method as in claim 16, wherein the step of applying a second voltage to the gate terminal of a field effect transistor switch comprises:
regulating the second voltage so as to attenuate signals passing through the field effect transistor switch, said attenuation being to a voltage level tolerated by both the first and second devices.

* * * * *